United States Patent [19]
Jordan, II et al.

[11] Patent Number: 5,875,442
[45] Date of Patent: Feb. 23, 1999

[54] METHOD AND APPARATUS FOR ENHANCING ACCESS TO A REMOTE DATABASE EMPLOYING DYNAMIC BUFFER MANAGEMENT

[75] Inventors: Lloyd Eugene Jordan, II; Shaw-Ben Shi; Martin Jay Sirkin, all of Austin; Paul Edwin Stephens, Cedar Park, all of Tex.

[73] Assignee: International Business Machines Corporation, Armonk, N.Y.

[21] Appl. No.: 923,634

[22] Filed: Aug. 3, 1992

[51] Int. Cl.⁶ .................................................. G06F 17/30
[52] U.S. Cl. ................................ 707/2; 707/7; 707/100; 395/872
[58] Field of Search ..................................... 395/600, 650, 395/425, 700, 872; 370/94.1; 707/2, 7, 100

[56] References Cited

U.S. PATENT DOCUMENTS

| | | | |
|---|---|---|---|
| 4,453,230 | 6/1984 | Mizoguchi et al. ..................... | 395/400 |
| 4,821,185 | 4/1989 | Esposito ................................... | 364/200 |
| 4,914,652 | 4/1990 | Nguyen ................................... | 370/85.5 |
| 5,058,051 | 10/1991 | Brooks ..................................... | 364/900 |
| 5,237,661 | 8/1993 | Kawamura et al. ..................... | 395/250 |
| 5,265,250 | 11/1993 | Andrade et al. ......................... | 395/650 |

FOREIGN PATENT DOCUMENTS

| | | |
|---|---|---|
| 0353927 | 7/1989 | European Pat. Off. . |
| 0374074 | 7/1989 | European Pat. Off. . |

OTHER PUBLICATIONS

IBM Technical Disclosure Bulletin, Frame Handler with Dynamic Allocation of Buffer Space, vol. 32, No. 6B, Nov. 1989, pp. 37–40.

Primary Examiner—Thomas G. Black
Assistant Examiner—Cheryl Lewis
Attorney, Agent, or Firm—Mark S. Walker

[57] ABSTRACT

A method, system and process for enhancing a database server by improving dynamic memory allocation and memory copying during the process of reconstructing a data structure from a communication buffer.

6 Claims, 6 Drawing Sheets

METHOD AND APPARATUS FOR ENHANCING ACCESS TO A REMOTE DATABASE EMPLOYING DYNAMIC BUFFER MANAGEMENT

FIELD OF THE INVENTION

The invention generally relates to improvements in database processing and more particularly to dynamic buffering to enhance remote access to a database.

BACKGROUND OF THE INVENTION

System management of remote access to a database is the subject of numerous articles and patents. For example, U.S. Pat. No. 5,014,221 discloses a print server with arbitrated client access, U.S. Pat. No. 4,511,964 discloses dynamic memory mapping for a memory controller that serves to effectuate the allocation, extension and deallocation of dynamic structures, and U.S. Pat. No. 5,025,491 discloses a communication network with associated server stations and server addresses resolved by a computer algorithm. However, none of the prior art references that applicant is aware of discloses the enhanced database server of the subject invention.

SUMMARY OF THE INVENTION

Accordingly, it is a primary objective of the present invention to provide dynamic buffering to enhance a database server.

These and other objectives of the present invention are accomplished by constructing a data structure in a memory on a first computer for use in accessing information from a database on a second computer by calculating a memory requirement data structure from data structures generated by a processor in the first computer and constructing a communication buffer. The communication buffer contains the memory requirement data structure and information from the database including the contents of the data structure.

The dynamic buffer refers to the ability to handle data structure information that will not fit in a single communication buffer. Thus, if a single communication buffer will not accommodate the transmission, then additional communication buffers are constructed containing additional information. The communication buffers are transmitted to a second computer where they are received and parsed to determine the memory necessary on the second computer to accommodate the data structure in the one or more communication buffers. Thereafter, the second computer allocates a contiguous memory if the database information can not fit into one communication buffer and dynamically adjusts the location of the communication buffer so that database information will be received directly into the contiguous memory allocated in without additional memory copying overhead.

If the memory requirements are more than the size of the communication buffer, the server allocates a buffer which can accommodate the entire data structure. Instead of copying the communication buffer into the buffer, pointers are assigned to the address of the buffer allocated for the data structure. Then the pointers are dynamically adjusted so that data is received directly into the buffer. After all data has been received, the server adjusts pointers in the buffer to reconstruct the engine data structure back.

DETAILED DESCRIPTION OF THE INVENTION

Figure 1:
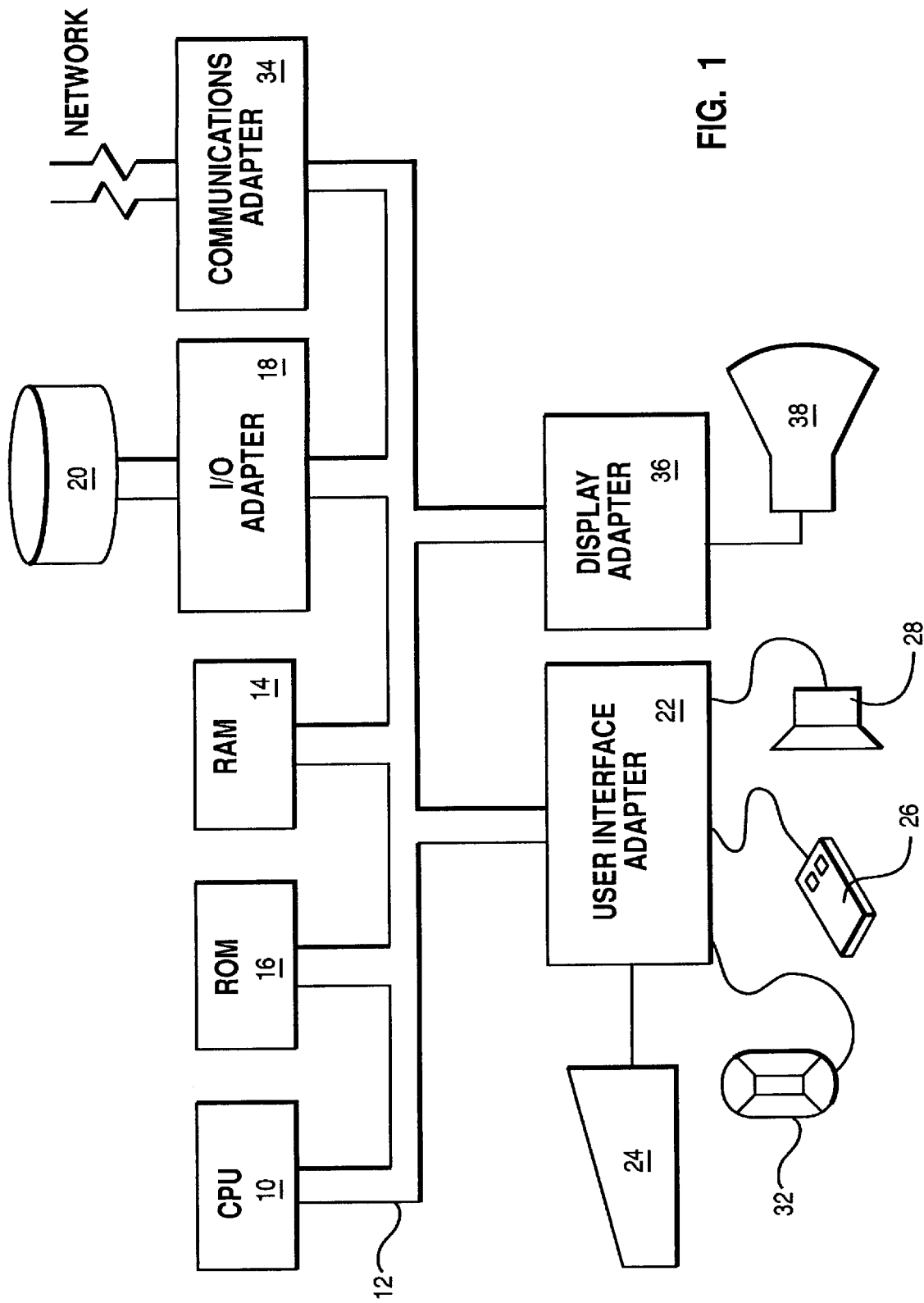
FIG. 1 is a block diagram of a personal computer system in accordance with the subject invention.

The invention is preferably practiced in the context of an operating system resident on an IBM PS/2 computer available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the OS/2 operating system and the computer software making up this invention which is included as a toolkit.

A private protocol was implemented in IBM's OS/2 1.3 Extended Edition (EE) operating system to provide remote access to a relational database. The protocol is discussed in detail in two IBM publications, 1. *Distributed Relational Database Architecture Reference*, August 1990, IBM, SC26-4651; and 2. *Distributed Data Management (DDM) Architecture Reference,* August 1990, IBM, SC21-9526. Performance tests uncovered a problem with the memory allocation and memory copying during the process of reconstructing the database data structures.

The invention discloses an efficient design for server memory allocation for a remote protocol. The protocol is designed for OS/2 Extended Services (ES) 1.0 Remote Database Service. The system uses a communication buffer without allocating extra storage for reconstructing data structures. It reduces memory requirement for the server, and reduces the cost of memory copying.

Compared with the previous design in OS/2 1.3 Extended Edition (EE), the current remote protocol achieves up to 56 percent speedup in throughput and 36 percent speedup in end user response time. The design of SQLJRA remote protocol leverages data structures built on either the client or the server in a homogeneous environment that are similarly structured. Therefore, the underlying data structures are passed directly, without the conversion step being necessary.

On the client, a data stream constructor builds a data stream from the data structures. If the data structure contains a pointer, the actual data pointed to by those pointers will be placed in the data stream. The data structure reconstructor on the server builds the data structures according to the data string received from the client. In order to rebuild the engine data structures on the server, the server needs to allocate memory for the data structures. The invention addresses the problem of how to allocate memory efficiently to reconstruct the data structures.

In OS/2 ES 1.0 database manager, each client and server has its own communication buffer to store the information sent and received. The size of the communication buffer is determined by the block size in the database configuration file. The minimum size of the communication buffer is 4K. The requestor will put data in the communication buffer and invoke communication routines to actually send the data. The server receives data from its own communication buffer.

Before the client puts the engine data structures into the communication buffer, the client must first calculate the total memory required by the database data structures. The database data structures include the JRA control structure, input SQLDA, output SQLDA and SQLCA. The memory requirement information will be put into the communication buffer. Then, the client copies the control structures into the communication buffer. If the communication buffer is filled up, the client calls the communication routines to send the buffer to the server.

The server, then, calls communication routines to receive data. The data sent by the client will be in server's communication buffer. Since the client put the memory requirement information into its communication buffer first, the server will receive it in the first buffer received. The server will then use this information to allocate memory for data structures.

Let the memory needed by the engine data structure be M, the size of the communication buffer be B and size of a segment be S. A segment is the maximum virtual memory that can be allocated for each memory allocation call. For example, a maximum segment size for 16 bit OS/2 is 64K. First, if the memory needed by the engine data structure (M) is less than the size of the communication buffer (B), then NO extra memory is needed. Since we passed these data structures in their native form, we can make use of the communication buffer to rebuild the engine data structure back. The client simply locates the starting position of each data structure, and assigns a new address to the pointer fields in the SQLJRA.

Figure 2:
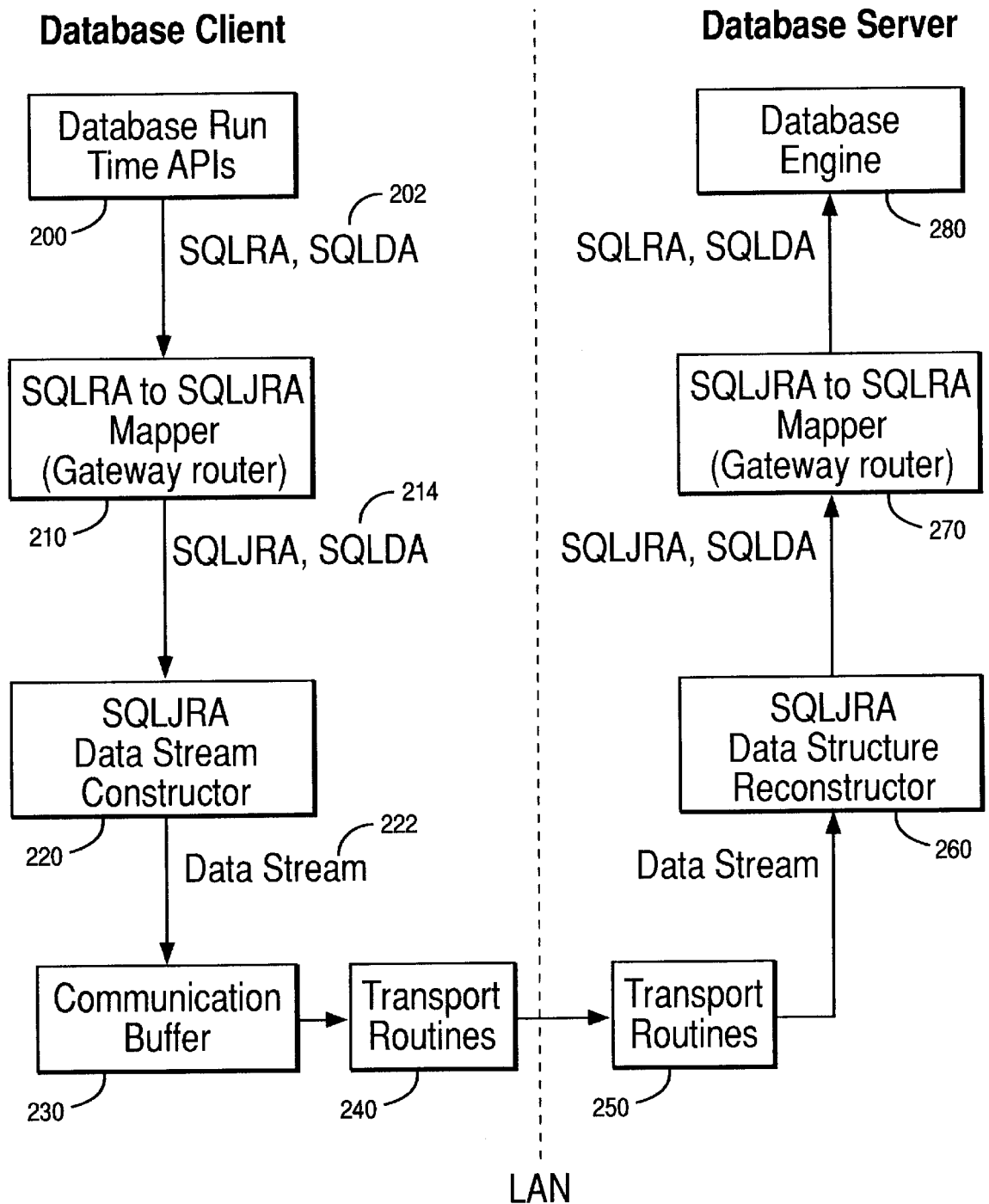
FIG. 2 is an example of the system control flow of a remote database request in accordance with the subject invention.

FIG. 2 illustrates a sample flow of information for remote database requests. First, the database runtime API routines 200 prepare database engine data structures 202 from user's SQL request. These data structures include SQLRA 202 (SQL Request Area) and SQLDA 202 (SQL Data Area). Then, the Gateway mapper 210 maps SQLRA to SQLJRA (Gateway Interface Request Area). The data structures (SQLJRA and SQLDA) 214 are given to the SQLJRA data stream constructor. Then, the SQLJRA data stream constructor 220 calculates the memory requirement for the data stream 222.

The information about the memory requirement will be put into a data structure (SQLCPLEN) which will be described later. SQLJRA data stream constructor will also construct a data stream 222 from the data structures and put the data stream into the communication buffer 230. The database manager transport routines 240/250 transmit the communication buffer to the server through transport layer communication protocol.

On the server side, the database manager 280 transport routines receives the data stream into a communication buffer. The first thing that the SQLURA data structure constructor 260 gets from the communication buffer is the memory requirement data structure. With the information in the memory requirement data structure, the server calculates what is the total memory requirement to reconstruct the data structure. The data structure constructor allocates appropriate memory size, receives data from the data stream into the allocated memory and rebuilds the data structure.

The reconstructed data structure is given to the gateway router 270 which maps the SQLJRA gateway interface structure into SQLRA which is the data structure that the database actually employs. The SQLRA and SQLDA are given to the database 280 to perform the SQL request.

Figure 3:
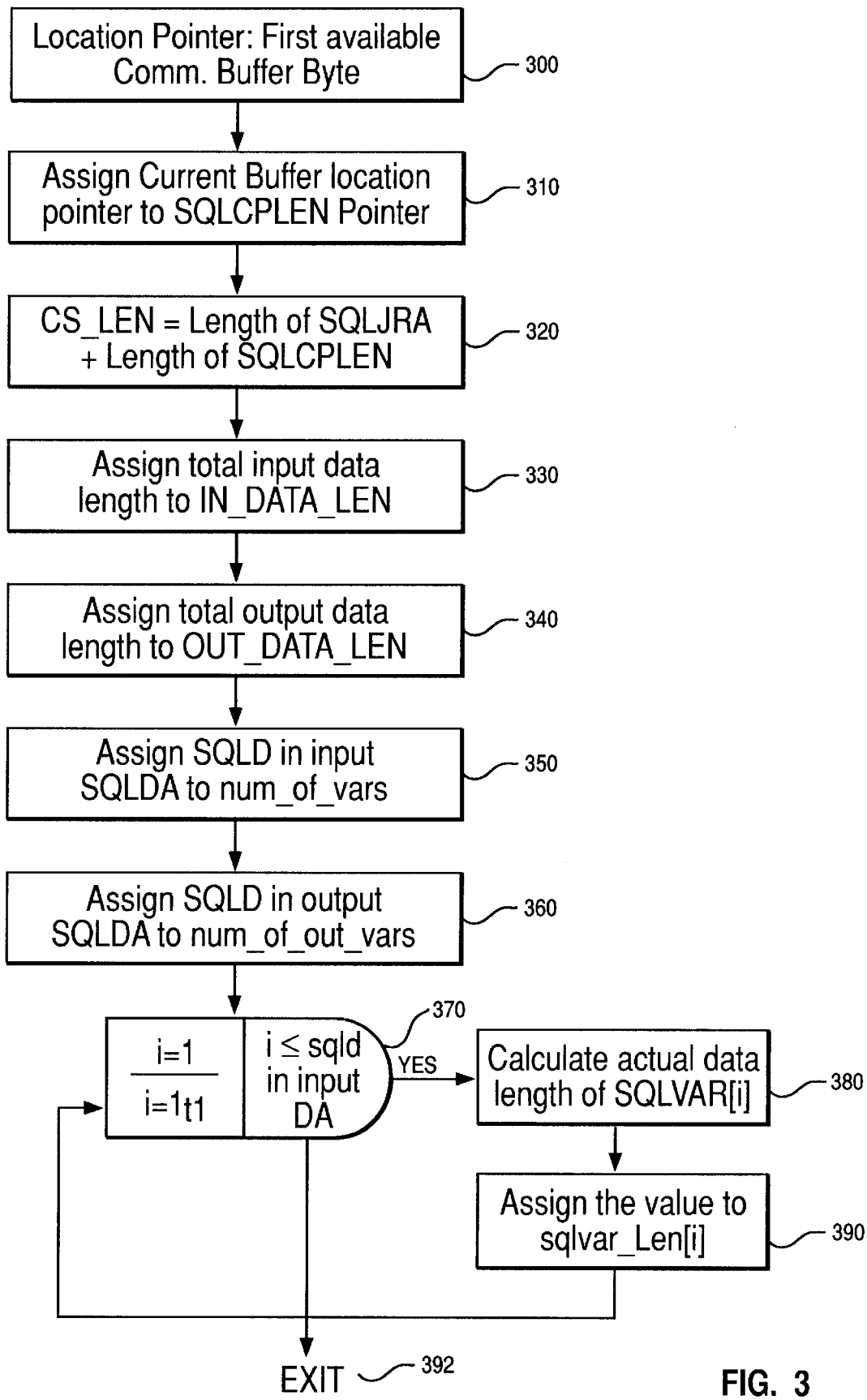
FIG. 3 is a flowchart setting forth the detailed logic in accordance with the subject invention.

FIG. 3 is the detailed flowchart of SQLJRA data stream constructor on the client. As mentioned above, the data stream constructor needs to prepare a data structure which contains the memory requirement information needed by the server. Processing commences at function block 300 where a location pointer is initialized to the first available record in the communication buffer. Then, in function block 310, the current buffer location pointer is assigned to SQLCPLEN, the length of the two data structures are calculated in function block 320, and total input and output data lengths are assigned to the appropriate variables as shown in function blocks 330 and 340. Then, the number of variables for input and output are calculated and placed in the communication buffer as shown in function block 350 and 360. Finally in function blocks 370, 380 and 390 the length of each variable in the communication buffer are recorded and an exit is performed at terminal 392.

DATA STRUCTURE IN ACCORDANCE WITH THE SUBJECT INVENTION

The following is the control structure that the client passes to the server to indicate the memory and data length information.

```
struct sqlcplen
{
    unsigned long cs_len;
    unsigned long in_data_len;
    unsigned long out_data_len;
    unsigned long num_of_vars;
    unsigned long num_of_out_vars;
    unsigned long sqlvar_len[1];
};
```

An intuitive approach to building this data structure is to define a structure, to assign values in the structure and then move it into the communication buffer. Instead, a control structure is built in the communication buffer and values are stored in the appropriate control structures. In this case, it is not necessary to copy the control structure into the data stream.

CS_LEN is the total length of the control structures which include SQLJRA and SQLCPLEN. The server uses this information to locate the end of the control structure.

IN_DATA_LEN is the length of user input data area.

OUT_DATA_LEN is the length of the user output data area.

IN_$_{DATA}$_LEN and OUT_DATA_LEN are used not only for calculating the total memory space needed for data structures but also used for calculating number of segments needed for user input and output data area.

NUM_OF_VARS is the number of input and output sqlvars. The value of NUM_OF_VARS is passed from SQLD in the user input SQLDA.

NUM_OF_OUT_VARS is the number of output sqlvars. The value of NUM_OF_OUT_VARS is passed from SQLD in the user output SQLDA.

SQLVAR_LEN is an array to store the actual data length of each sqlvar. Each SQLVAR in the user's input SQLDA be inspected to get the actual data length. The server uses the NUM_OF_VARS to calculate the input SQLDA length (IN_DA_LEN) and use NUM_OF_OUT_VARS to calculate the output SQLDA length (OUT_DA_LEN).

Figure 4:
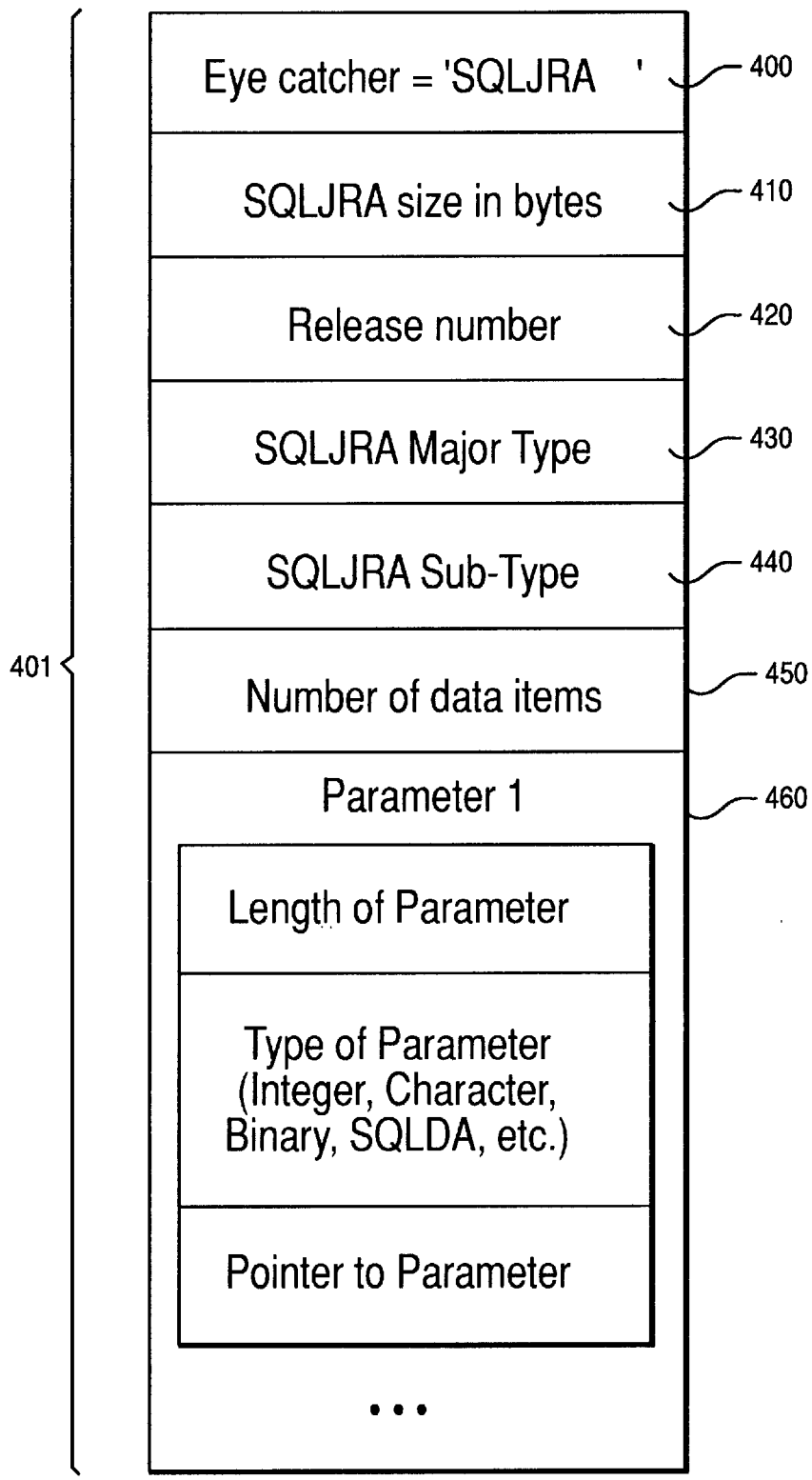
FIG. 4 is a diagram of a data structure in accordance with the subject invention.

As can be seen from FIG. 4, the SQLJRA data structure 401 consists of 2 general parts, header information and a set of parameters. The header information 400, 410, 420, 430, 440, and 450 describes the SQLJRA data structure and the type of request. Each parameter 460 is a triplet consisting of a length, a type and a pointer. This step moves data pointed to by the parameter pointer into the communication buffer containing the communication data stream. The intuitive way to implement this function is to deference parameter pointer one at a time and put the data into the data stream. Since each triplet has the same structure, it is more efficient to have a loop for dereferencing the triplet pointers.

A triplet structure is defined and cast as the first SQLJRA triplet address with a pointer to this triplet structure, and then the triplet pointer is employed to access each SQLJRA parameters.

Fourth, the client moves input and output SQLDA into the data stream. Finally, the client loops through user input SQLDA and puts the input data into the data stream. Since each sqlvar has the same structure, the same technique that we use for SQLJRA triplet is applied here.

Figure 5:
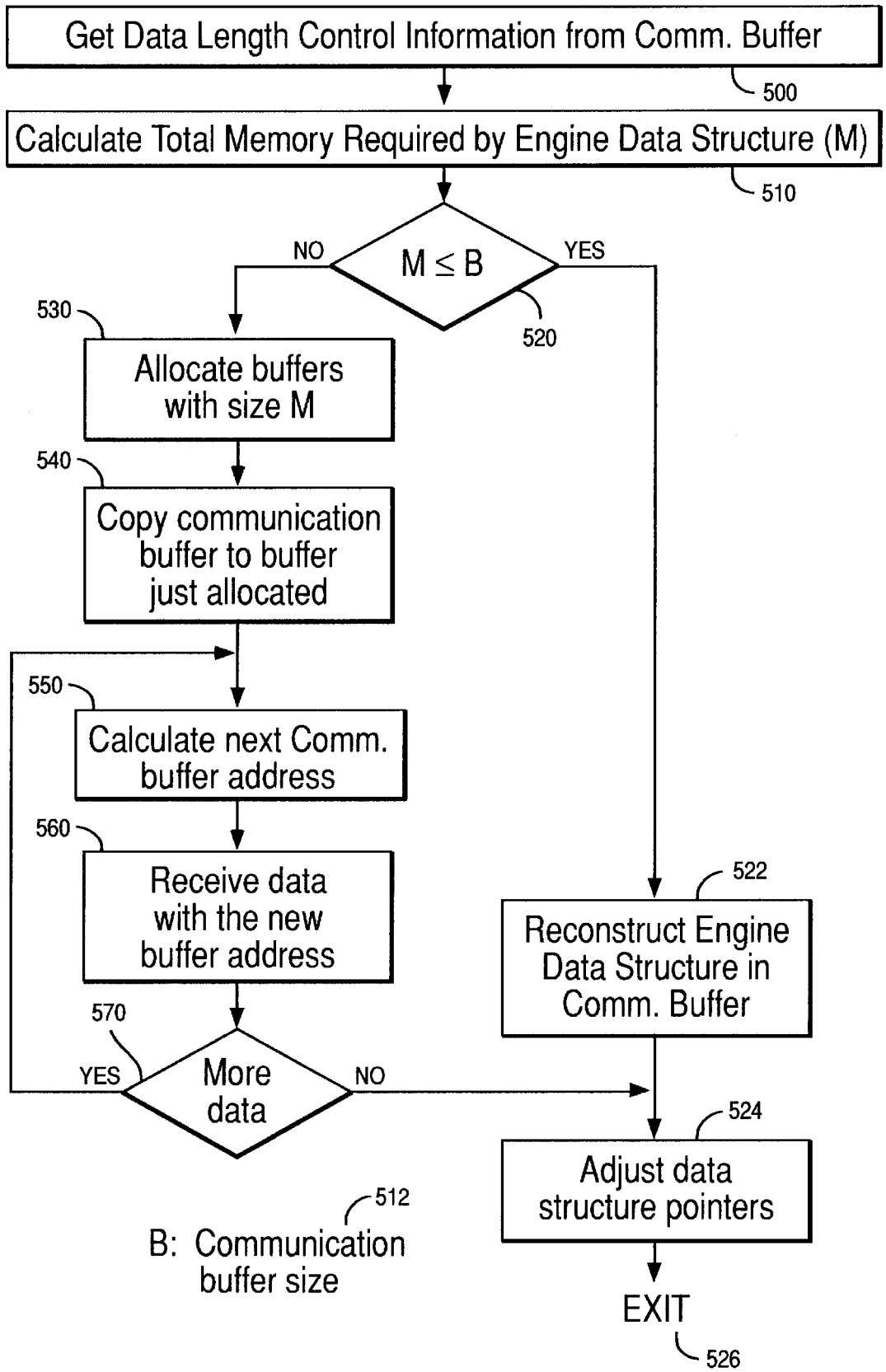
FIG. 5 is a flowchart of a data structure reconstruction routine of the server in accordance with the subject invention.

FIG. 5 is the detail flowchart of the data structure reconstructor on the server. The first thing that the data structure reconstructor gets from the communication buffer is the data length control structure as shown in function block 500. With this information, the server calculates total memory space needed (M) for data structures as shown in function block 510. First of all, if the memory needed by the data structure (M) is determined to be less than the size of the communication buffer (B) in decision block 520, then NO extra memory is needed. Since SQLJRA remote protocol passed these data structures in its native forms, the communication buffer is used to rebuild the data structure as shown in function block 522. The client just locates the starting position of each data structure, and assign the new address to the pointer fields in the SQLJRA as shown in function block 524 and exits via terminal 526.

If the memory necessary is larger than one communication buffer as detected in decision block 520, then, the server allocates a buffer which can accommodate the data structure as shown in function block 530. If the location of the buffer is B, the size of the communication buffer is C, and the location of the communication buffer is L, then the number of receives that the server invokes is i.

First, the server copies the contents of the communication buffer into the server buffer as shown in function block 540. After the copying, the server dynamically adjusts the address of the communication buffer according to the following formula as shown in function blocks 550 and 560:

$$L = (B + (i-1)*C) - 2$$

Two is subtracted from L because SNA requires the first two bytes of the communication buffer to be the actual data length received by the server. Before the receive, the server needs to save the last two bytes of the communication buffer and to restore it back after the receive is finished. All data will be received into the server buffer in order as shown in function block 560. After all the data is received, the server will locate the starting position of data structures and assign pointers in the SQLJRA control structure as shown in function block 524.

Figure 6:
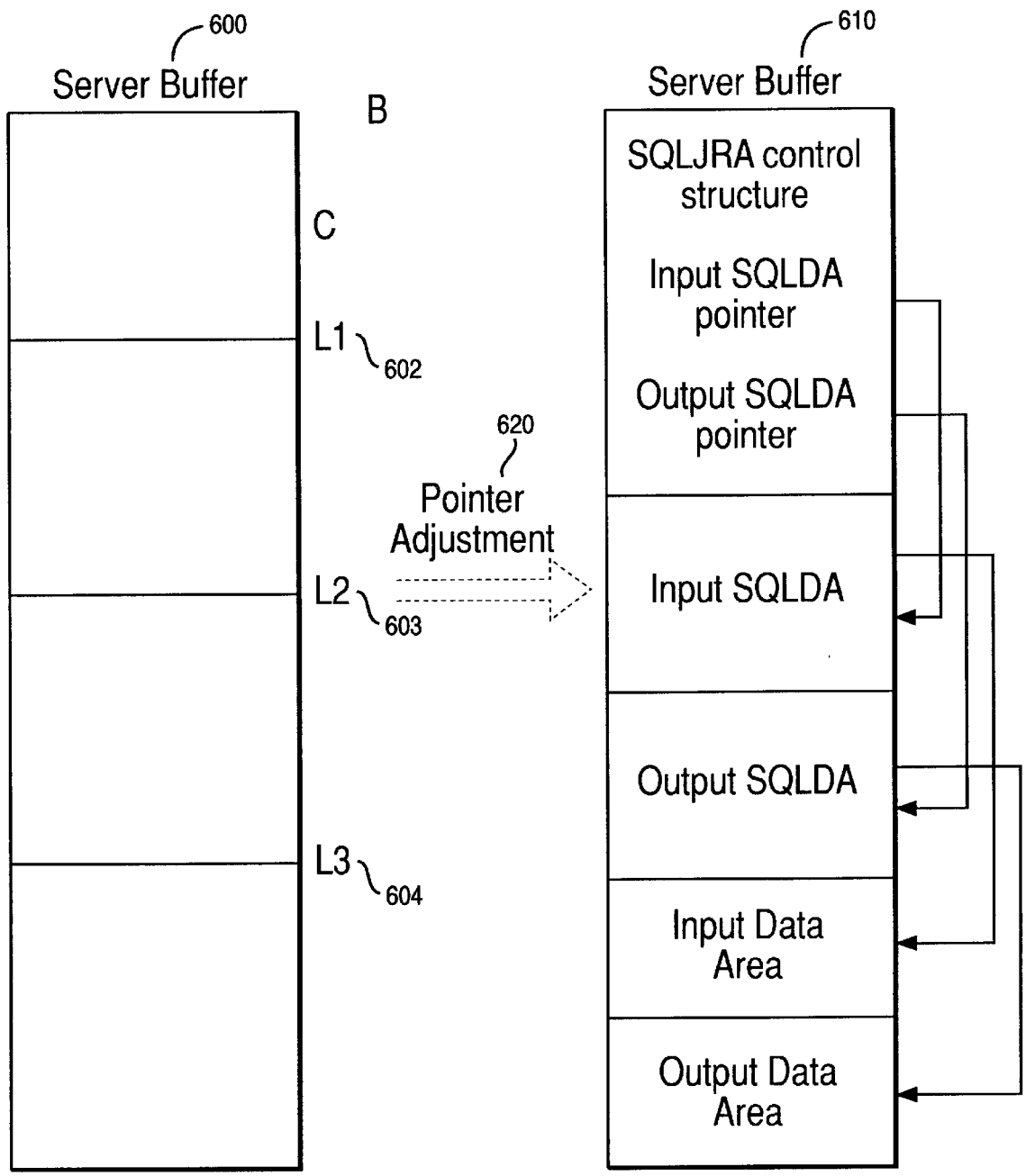
FIG. 6 is an example of a dynamic buffer logic in accordance with the subject invention.

FIG. 6 is an example of data structure reconstruction in accordance with the subject invention. L1 602 is the communication buffer 600 address for the second receive, L2 603 is the communication buffer address for the third receive and L3 604 is the communication buffer address for the fourth receive. After all data is received by the server in the server buffer 610, the server adjusts pointers in the data structure 620.

"C" SOURCE CODE IN ACCORDANCE WITH THE SUBJECT INVENTION

```
/*****************************-PROLOGUE-*****************************
**
*                                                                   *
* OCO SOURCE MATERIALS
*
*                                                                   *
* MODULE NAME:    sqlcpsvr                                         *
*                                                                   *
```

```
* COMPONENT NAME:    Distributed Data Services
*
*                    JRA data stream server                           *
*                                                                 *
* LPP NAME:          Gemstone                                       *
*                                                                 *
* DESCRIPTIVE NAME:  Receive JRA data stream
*
*                                                                 *
* COPYRIGHT:         program-number (C) COPYRIGHT IBM CORP 1991
*
*                                                                 *
* STATUS:            Development Phase                              *
*                                                                 *
* FUNCTION:                                                         *
*     This module contains a set of functions which receive the JRA data *
*     stream, send it to the database engine, and return the results to  *
*     the requester.                                              *
*                                                                 *
* COMPILER OPTIONS:                                                 *
*     see sqlc.cop                                                *
*                                                                 *
* INPUT:                                                            *
*                                                                 *
*     The following is the standard data flow of a data request:     *
*                                                                 *
*     Item    Element                                              *
*     ------------------------------------------------------------*
*     1.      Amount of data in 1st Communications buffer.            *
*     2.      The SQLJRA (with no meaningful data in any pointer fields). *
*     3.      Length of the control structures (Everything through item #9 *
*             (up to item #10)). This does include item #1 (2 bytes). *
*     4.      Length of the input data.                              *
*     5.      Length of the output data (if any).                    *
*     6.      Number of items in array #8.                          *
*     7.      Number of output SQLVARS. If there is no output DA this will*
*             be 0.                                              *
*     8.      Array of the actual lengths of the input data items (lengths *
*             in the input SQLDA can be maximums).                   *
*     9.      SQLJRA parameters (data in fields accessed by pointers). *
*     10.     Input SQLDA (no data).                                *
*     11.     Ouput SQLDA (no data).                                *
*     12.     Input data.                                          *
*                                                                 *
*     Note: It is highly likely everything is the first buffer.       *
*                                                                 *
* OUTPUT:                                                           *
*                                                                 *
*     The following is the standard data flow of data returned from the *
*     server:                                                      *
*                                                                 *
*     Item    Element                                              *
*     ------------------------------------------------------------*
*     1.      Amount of data in 1st Communications buffer (unsigned int). *
*     2.      The two byte return code from sqledscr (the router).     *
*     3.      A NULL indicator for the SQLCA. If it is 0, a SQLCA is    *
*             returned. If it is less than 0, no SQLCA is returned.    *
*             A SQLCA is always returned for start using database.    *
*     4.      Optional SQLCA. See Item #3 for a description.           *
```

```
*                                                                      *
*     The rest of the data returned depends on the SQLJRA request type.  *
*                                                                      *
*     For execute commands:                                             *
*                                                                      *
*     5.    A NULL indicator for the data. If it is 0, a data row is   *
*           returned. If it is less than 0, no data row is returned.    *
*     6.    A data row. Each data row consists of n SQLVARs, where n is *
*           the number listed in the output SQLDA. Each SQLVAR          *
*                                                                      *
*           consists of the following:                                  *
*                                                                      *
*           1. NULL indicator. This describes if the data is NULL or is *
*              present. A 0 value indicates data. Less than 0           *
*              indicates that no data is sent.                          *
*           2. Optional data. See Item 5.1 above for a description.     *
*                                                                      *
*     For start using commands:                                         *
*                                                                      *
*     5. The database name (10 bytes).                                  *
*     6. The server SBCS codepage (2 bytes).                            *
*     7. The server comm buffer length (2 bytes).                       *
*     8. The server process ID (2 bytes).                               *
*     9. The server thread ID (2 bytes).                                *
*     10. The server release level (10 bytes).                          *
*                                                                      *
*     For prepare and describe commands:                                *
*                                                                      *
*     5. The number of output SQLVARS used (output DA sqld field - 2    *
bytes)*
*     6. Optional output DA (with no data). This DA is only sent if the *
*        output DA sqld field is smaller or equal to the allocated size *
*        (the output DA sqln field).                                    *
*                                                                      *
************************************************************************
*     For fetches ONLY WHEN the cursor is using blocking:               *
*     This flow is different than the others. Each row has the same flow *
*     as an execute command.                                            *
*                                                                      *
*     1.    Amount of data in 1st Communications buffer (unsigned int). *
*     2.    Number of rows fetched in this buffer.                      *
*     3.    Is the last row in this buffer the last row that can be    *
*           fetched from the cursor? 0 = no, -1 = yes.                  *
*                                                                      *
*     After this, each row consists of the following:                   *
*                                                                      *
*     4.    The two byte return code from sqledscr (the router).        *
*     5.    A NULL indicator for the SQLCA. If it is 0, a SQLCA is     *
*           returned. If it is less than 0, no SQLCA is returned.       *
*     6.    Optional SQLCA. See Item #5 for a description.              *
*     7.    A NULL indicator for the data. If it is 0, a data row is   *
*           returned. If it is less than 0, no data row is returned.    *
*     8.    A data row. Each data row consists of n SQLVARs, where n is *
*           the number listed in the output SQLDA. Each SQLVAR          *
*                                                                      *
*           consists of the following:                                  *
*                                                                      *
*           1. NULL indicator. This describes if the data is NULL or is *
*              present. A 0 value indicates data. Less than 0           *
```

```
*                 indicates that no data is sent.                           *
*           2. Optional data.  See Item 7.1 above for a description.        *
*                                                                           *
*    For open cursors when blocking is to be used on the cursor:            *
*                                                                           *
*    1.    Amount of data in 1st Communications buffer (unsigned int).      *
*    2.    The two byte return code from sqledscr (the router).             *
*    3.    A NULL indicator for the SQLCA.  If it is 0, a SQLCA is          *
*          returned.  If it is less than 0, no SQLCA is returned.           *
*          A SQLCA is always returned for start using database.             *
*    4.    Optional SQLCA.  See Item #3 for a description.                  *
*    5. The number of output SQLVARS used (output DA sqld field - 2
bytes)*
*    6. Optional output DA (with no data).  This DA is only sent if the     *
*       output DA sqld field  is smaller or equal to the allocated size     *
*       (the output DA sqln field).                                         *
*    7. Number of rows fetched in this buffer.                              *
*    8. Is the last row in this buffer the last row that can be             *
*       fetched from the cursor?  0 = no, -1 = yes.                         *
*    9. Any data rows (if #7 > 0).  See the fetch description above for     *
*       row contents.                                                       *
*                                                                           *
*    Note: It is highly likely everything is the first buffer.              *
*                                                                           *
* RETURN CODE:                                                              *
*    See individual function description                                    *
*                                                                           *
****************************************************************************/

/****************************************************************************/
/***    Include statements.                                              ***/
/****************************************************************************/ define SQLZ_STACK          /* Do not invoke api macros*/
define LINT_ARGS 1
#define INCL_SQLOMMDC
define INCL_SQLOIPDC 1 include "sqlz.h"
include "sqlo.h"
#include "sqlocall.h"
#include "sqlenv.h"
#include "sqljra.h"
#include "sqljrai.h"
#include "sqler.h"
#include "sqlra.h"
#include "sqlca.h"
#include "sqlcc.h"
#include "sqlcm.h"
#include "sqlcmi.h"
#include "sqle.h"
#include "sqleapi.h"
#include "sqlei.h"
#include "sqltc.h"
#include "sqlchdda.h"
#include "sqlc.h"
#include "sqlci.h"
#include "sqlcodes.h"
#include "sqlrx.h"
```

```
#include "sqlda.h"
#include "sql.h"
#include "sqlcitoh.h"

#include "sqlcpcom.h"
#include "sqlcpccb.h"
#include "sqlcpsvr.h"

/****************************************************************************/
/* Function name: SQLCPSVR_RECEIVE                                         */
/* Function:                                                              */
/*      Receive a JRA request from a client, and marshall it.             */
/* Input:                                                                 */
/*      DDSACB pointer                                                    */
/* Output:                                                                */
/*      Return code of status of operation.                               */
/****************************************************************************/ short SQLZ_LOCAL sqlcpsvr_receive(struct sqlcacb *ddsacb)

{
    short retcode = 0;              /* Function return code.              */
    short t_count, t_count2;        /* Looping variables.                 */
    unsigned char *buf_ptr;         /* Pointer for use in scanning larger */
                                    /* buffer.                            */
    unsigned char *cb_buf_ptr;      /* Used only for parsing das.         */
    unsigned short buffer_len;      /* Length of the comm buffer.         */
    unsigned long total_len;        /* Total length of the entire request */
    unsigned long total_input_len;  /* Total length except output data.   */
    unsigned long ctl_struct_len;   /* Length of the control structures.  */
    unsigned long in_data_len;      /* Length of the input data.          */
    unsigned long out_data_len;     /* Length of the output data.         */
    unsigned long num_in_sqlvars;   /* Number of entries in the array of  */
                                    /* input data lengths.                */
    unsigned long num_out_sqlvars;  /* Number of output SQLVARs.
*/
    unsigned long input_da_len;     /* Length of the input DA (no data).  */
    char *jra_params;               /* Pointer to the SQLJRA parameters.  */
    char **triplet_ptr;             /* Pointer to triplets in SQLJRA.     */
    unsigned long *length_ptr;      /* Pointer to length field in triplets*/
    unsigned long *in_da_lens;      /* Pointer to array of actual input   */
                                    /* DA lengths.                        */
    struct sqlda *in_da_ptr = NULL; /* Pointer to input DA in the buffer. */
    char *input_data;               /* Pointer to the start of the input  */
                                    /* data.                              */
    char *output_data;              /* Pointer to the start of the output */
                                    /* data.                              */
    struct sqlvar *t_sqlvar;        /* Pointer to a SQLVAR from SQLDA
*/
    struct sqlda *private_out_da;   /* Private copy of the output DA.     */
                                    /* move_data call.                    */
    unsigned long total_received;   /* Total received so far.             */
    unsigned int amt_to_copy;       /* Amount left to copy.               */
    unsigned int temp_holder;       /* Variable to hold last two bytes of */
                                    /* buffer during copy of next comm    */
                                    /* buffer.                            */
    unsigned short receive_length;  /* How much data was received.        */
    unsigned short parse_da_data = FALSE;
```

```
                                        /* Should data for the das be parsed  */
                                        /* to see if it has to go in multiple*/
                                        /* bufs?                              */ unsigned long *t_in_da_lens;    /* Pointer to array of actual input   */
        unsigned short start_var;       /* Which is first sqlvar in this seg? */
        unsigned short total_var_space; /* How much space used up in cur seg?
        */
        unsigned short this_var_space;  /* How much space does this var take  */
                                        /* up?                                */
        short done_with_input;          /* Are we done with the input var?    */
        unsigned char *t_run_ptr;       /* Temp pointer for runstats.         */
        unsigned char *t_addr_ptr;      /* Temp pointer for runstats.         */
        struct sqlcp_ccb *temp_ccb;     /* Temp CCB pointer.                  */
        unsigned long rcv_out_da_len;   /* Length of the output DA sent by rqr*/

/***********************************************************************/
                                        /* Get the address of the comm buffer.*/
                                        /* Get the length of the data in the  */
                                        /* buffer (it is byte-reversed).      */
                                        /* Byte reverse it.                   */
                                        /* Move the pointer to start of the   */
                                        /* SQLJRA.                            */
        comm_buffer = ddsacb->buffer;
        sqlzmcpy(&buffer_len, comm_buffer, SQLC_SHORT_SIZE);
        buffer_len = SQLC_SWAP2(buffer_len);
        comm_buffer += SQLC_SHORT_SIZE;

/* Set a pointer to the SQLJRA in the */
                                        /* Comm buffer.                       */
                                        /* Move to the length fields.         */
        dcsra = (SQLJDSRA *)&comm_buffer[0];
        comm_buffer += sizeof(SQLJDSRA);

/* Assign the SQLCA in the SQLJRA.    */
        dcsra->sqlrcap = (char *) &ddsacb->cb.aacb.sqlca;

/* No errors found.                   */
                                        /* Clear out status variable for out  */
                                        /* DA memory storage.                 */
                                        /* Clear out variables to tell us what*/
                                        /* kind of request this is. We only   */
                                        /* care about a few special request   */
                                        /* types that require special         */
                                        /* processing.                        */
                                        /* Find out if this is a start using. */
                                        /* Find out if this is a compile stmt */
                                        /* or not. Compile statements have    */
                                        /* input Das, but no input data. The  */
                                        /* DA has SQLVAR length and name
        */
                                        /* information for the host variables*/
                                        /* so we don't want to try to set the*/
                                        /* data pointers in the DA.           */
                                        /* Find out if this is a runstats.    */
                                        /* runstats has input DA too, but no  */
                                        /* data. Also we have to adjust the   */
                                        /* pointers in theDCSRA->SQLJRDATA[1*/
```

```
                                                    /* field to point to the input DA.      */
                                                    /* Find out if it is one of several     */
                                                    /* other type of commands that need     */
                                                    /* special processing.                  */
    error_found = 0;
    allocate_out_da = 0;
    start_using = 0;
    compile = 0;
    runstat = 0;
    prep_desc = 0;
    ari = 0;
    op_stat = 0;
    open_cursor = 0;
    close_cursor = 0;
    fetch = 0;
    exec = 0;
    blocking = 0;
    switch (dcsra->sqltype)
    {
       case SQLJ_DCSSV: switch (dcsra->sqlrtype)
                       {
                          case SQLJR_STARTGW:
                                       start_using = 1;
                              if (ddsacb->length > SQLC_SIZE_MAXQRYBLK)
                              {
                                 ddsacb->length = SQLC_SIZE_MAXQRYBLK;
                              }
                                       break;
                          case SQLJR_RPC:
                                       ari = 1;
                                       break;
                          case SQLC_RT_OPSTAT:    op_stat = 1;
                                       break;
                       }
                       break;
       case SQLJ_DBSV: switch (dcsra->sqlrtype)
                       {
                          case SQLJR_COMPILE:  compile = 1;
                                       break;
                          case SQLJR_RUNSTATS: runstat = 1;
                                       break;
                          case SQLJR_PREPARE:
                          case SQLJR_DESCRIBE: prep_desc = 1;
                                       break;
                          case SQLJR_OPEN:     open_cursor = 1;
                                       break;
                          case SQLJR_CLOSE:    close_cursor = 1;
                                       break;
                          case SQLJR_FETCH:    fetch = 1;
                                       break;
                          case SQLJR_EXECUTE:  exec =1;
                                       break;
                       }
                       break;
    }
                                                    /* Get the control structures length */
                                                    /* Get the input data length.        */
                                                    /* Get the output data length.       */
```

```
                                        /* Get the number of input sqlvars.    */
                                        /* Get the number of output sqlvars.   */
                                        /* Get the size of the input DA.       */
                                        /* If it is zero in the JRA, leave it*/
                                        /* Otherwise it is a DA of num_in_var*/
                                        /*   sqlvars. This can be smaller    */
                                        /*   than the size in the JRA (if the */
                                        /*   sqld field is smaller than sqln).*/
                                        /* Get the size of the output DA for  */
                                        /* both memory allocation and rcving.*/
sqlzmcpy(&ctl_struct_len, comm_buffer, SQLC_LONG_SIZE);
comm_buffer += SQLC_LONG_SIZE;
sqlzmcpy(&in_data_len, comm_buffer, SQLC_LONG_SIZE);
comm_buffer += SQLC_LONG_SIZE;
sqlzmcpy(&out_data_len, comm_buffer, SQLC_LONG_SIZE);
comm_buffer += SQLC_LONG_SIZE;
sqlzmcpy(&num_in_sqlvars, comm_buffer, SQLC_LONG_SIZE);
comm_buffer += SQLC_LONG_SIZE;
sqlzmcpy(&num_out_sqlvars, comm_buffer, SQLC_LONG_SIZE);
comm_buffer += SQLC_LONG_SIZE;
if (compile )
{
    input_da_len = dcsra->sqlrdail;
}
else
{
    input_da_len = (dcsra->sqlrdail > 0) ? SQLDASIZE(num_in_sqlvars) : 0;
}
output_da_len = dcsra->sqlrdaol;
rcv_out_da_len = output_da_len;
if   (output_da_len > 0)
{
    rcv_out_da_len = SQLDASIZE(num_out_sqlvars);
}

/* Get the data length sent from the  */
                                        /* client. It is composed as follows*/
                                        /* 1) Two bytes - Length of buffer.   */
                                        /* 2) Size of all control structs.    */
                                        /* 3) Sizes of input/output DAs.      */
                                        /* 4) Size of input data.             */
                                        /* Get our total space needs. It is   */
                                        /* equal to the input space plus the  */
                                        /* space needed for the output data. */
total_input_len = SQLC_SHORT_SIZE + ctl_struct_len + input_da_len +
                rcv_out_da_len + in_data_len;
total_len = SQLC_SHORT_SIZE + ctl_struct_len + input_da_len +
output_da_len
          + in_data_len + out_data_len;

/* If everything will fit into the    */
                                        /* one Comm, buffer...                */
                                        /* 1) We don't need any segments.     */
                                        /* 2) Set up a pointer for rest of    */
                                        /*    the buffer manipulations.       */
if   (total_len <= ddsacb->length)
{
    num_segs_needed = 0;
    buf_ptr = comm_buffer;
```

```
        }
        else
        {
                                        /* If it will all fit into one segmemt*/
                                        /*  (64K or less).                    */
                                        /* Mark that we need one segment.     */
                                        /* Get the segment.                   */
                                        /* Copy the comm buffer into the      */
                                        /*   segment.                         */
                                        /* Set the pointer in the segment for */
                                        /*   the next receive.                */
                                        /* Get the length of the first receive*/
                                        /* Mark that as received so far.      */
                                        /* While there's more to get...       */
                                        /* Find out how much is left to copy.*/
                                        /* If it is less than one buffer...  */
                                        /*   Adjust amount to receive.        */
                                        /* Save the last two bytes received. */
                                        /* Get the next buffer.               */
                                        /* Copy back the 2 bytes (over the   */
                                        /*   new buffer's LL field).          */
                                        /* Increment total.                   */
                                        /* Move forward for next receive.    */
            if (total_len <= SQLO_MAXSEGSIZ)
            {
                retcode = sqloallocseg((unsigned int) total_len,
                                (char **) &segments[0],
                                SQLO_MM_SHARE_GIVE);
                if (retcode != 0)
                {
                    sqlcpsca((struct sqlca *)dcsra->sqlrcap, "SQLCPSVR",
                            (long) SQL_RC_E954);
                    sqlt_trace_error(SQLT_SQLC, SQLT_SQLCPSVR, 102, sizeof(short),
                            &retcode);
                    retcode = SQLJR_RCF_SQLCA;
                    error_found = 1;
                    goto rcv_end;
                }
                num_segs_needed = 1;
                sqlzmcpy(segments[0], ddsacb->buffer, buffer_len);
                buf_ptr = segments[0] + buffer_len - SQLC_SHORT_SIZE;
                receive_length = ddsacb->length;
                total_received = receive_length;
                while (total_received < total_input_len)
                {
                    amt_to_copy = (unsigned int)
                                (total_input_len - total_received +
SQLC_SHORT_SIZE);
                    if (amt_to_copy < ddsacb->length)
                    {
                        receive_length = amt_to_copy;
                    }
                    sqlzmcpy(&temp_holder, buf_ptr, SQLC_SHORT_SIZE);
                    retcode = sqlccrcv(&(ddsacb->comhandle), &receive_length,
                                buf_ptr, SQLC_FILL);
                    if (retcode != 0)
                    {
                        sqlcperc(&ddsacb->comhandle,(struct sqlca *)dcsra->sqlrcap,
                                "SQLCPSVR");
```

```
/*              sqlcpsca((struct sqlca *)dcsra->sqlrcap, "SQLCPSVR",
                        (long) SQL_RC_E30080);                    */
                sqlt_system_error(SQLT_SQLC, SQLT_SQLCPSVR, 108,
sizeof(short),
                        &retcode);
                retcode = SQLJR_RCF_TERMINATE | SQLJR_RCF_SQLCA;
                error_found = 1;
                goto rcv_end;
            }
            sqlzmcpy(buf_ptr, &temp_holder, SQLC_SHORT_SIZE);
            total_received += receive_length - SQLC_SHORT_SIZE;
            buf_ptr += receive_length - SQLC_SHORT_SIZE;
        }

/* Set up the SQLJRA pointer.     */
                                /* Mark location in new buffer.   */
        dcsra = (SQLJDSRA *) ((char *) segments[0] + SQLC_SHORT_SIZE);
        buf_ptr = segments[0] + (comm_buffer - ddsacb->buffer);
    }
    else
    {
                                /* We need a minimum of 3 buffers. */
                                /* Allocate a buffer for the control */
                                /*  structures (SQLJRA...)        */
                                /* Allocate a buf for input da.   */
                                /* Allocate a buf for output da.  */
                                /* Mark that we have to parse da  */
                                /*  data.                         */
        retcode = sqloallocseg((unsigned int)
                        (SQLC_SHORT_SIZE + ctl_struct_len),
                        (char **) &segments[0],
SQLO_MM_SHARE_GIVE);
        if (retcode != 0)
        {
            sqlcpsca((struct sqlca *)dcsra->sqlrcap, "SQLCPSVR",
                    (long) SQL_RC_E954);
            sqlt_trace_error(SQLT_SQLC, SQLT_SQLCPSVR, 103, sizeof(short),
                    &retcode);
            retcode = SQLJR_RCF_SQLCA;
            error_found = 1;
            goto rcv_end;
        }
        num_segs_needed = 1;
        retcode = sqloallocseg((unsigned int) input_da_len,
                        (char **) &segments[1],
SQLO_MM_SHARE_GIVE);

if (retcode != 0)
        {
            sqlcpsca((struct sqlca *)dcsra->sqlrcap, "SQLCPSVR",
                    (long) SQL_RC_E954);
            sqlt_trace_error(SQLT_SQLC, SQLT_SQLCPSVR, 104, sizeof(short),
                    &retcode);
            retcode = SQLJR_RCF_SQLCA;
            error_found = 1;
            goto rcv_end;
        }
        num_segs_needed = 2;
        retcode = sqloallocseg((unsigned int) output_da_len,
```

```
                                    (char **) &segments[2],
                                    SQLO_MM_SHARE_GIVE);
                        if (retcode != 0)
                        {
                            sqlcpsca((struct sqlca *)dcsra->sqlrcap, "SQLCPSVR",
                                    (long) SQL_RC_E954);
                            sqlt_trace_error(SQLT_SQLC, SQLT_SQLCPSVR, 105, sizeof(short),
                                    &retcode);
                            retcode = SQLJR_RCF_SQLCA;
                            error_found = 1;
                            goto rcv_end;
                        }
                        num_segs_needed = 3;
                        parse_da_data = TRUE;

/* Get start of first comm buffer.  */
                                            /* Receive control data into a segment*/
                                            /* If there's an input da, get it.   */
                                            /* If there's an output da, get it.  */
                        cb_buf_ptr = ddsacb->buffer;
                        retcode = sqlcpgd(ddsacb, &cb_buf_ptr, ddsacb->buffer, segments[0],
                                    (unsigned int) (SQLC_SHORT_SIZE + ctl_struct_len),
                                    FALSE);
                        if (retcode != 0)
                        {
                            sqlcperc(&ddsacb->comhandle,(struct sqlca *)dcsra->sqlrcap,
                                    "SQLCPSVR");
                    /*      sqlcpsca((struct sqlca *)dcsra->sqlrcap, "SQLCPSVR",
                                    (long) SQL_RC_E30080);                          */
                            sqlt_trace_error(SQLT_SQLC, SQLT_SQLCPSVR, 109, sizeof(short),
                                    &retcode);
                            retcode = SQLJR_RCF_TERMINATE | SQLJR_RCF_SQLCA;
                            error_found = 1;
                            goto rcv_end;
                        }
                        if (input_da_len > 0)
                        {
                            retcode = sqlcpgd(ddsacb, &cb_buf_ptr, ddsacb->buffer,
                                        segments[1], (unsigned int) (input_da_len),
                                        FALSE);
                            if (retcode != 0)
                            {
                                sqlcperc(&ddsacb->comhandle,(struct sqlca *)dcsra->sqlrcap,
                                        "SQLCPSVR");
                    /*          sqlcpsca((struct sqlca *)dcsra->sqlrcap, "SQLCPSVR",
                                        (long) SQL_RC_E30080);                          */
                                sqlt_trace_error(SQLT_SQLC, SQLT_SQLCPSVR, 110,
                                        sizeof(short), &retcode);
                                retcode = SQLJR_RCF_TERMINATE | SQLJR_RCF_SQLCA;
                                error_found = 1;
                                goto rcv_end;
                            }
                        }
                        if (rcv_out_da_len > 0)
                        {
                            retcode = sqlcpgd(ddsacb, &cb_buf_ptr, ddsacb->buffer,
                                        segments[2], (unsigned int) (rcv_out_da_len),
                                        FALSE);
                            if (retcode != 0)
```

```
                    {
                        sqlcperc(&ddsacb->comhandle,(struct sqlca *)dcsra->sqlrcap,
                            "SQLCPSVR");
            /*          sqlcpsca((struct sqlca *)dcsra->sqlrcap, "SQLCPSVR",
                            (long) SQL_RC_E30080);                          */
                        sqlt_trace_error(SQLT_SQLC, SQLT_SQLCPSVR,
                                    111, sizeof(short),
                                    &retcode);
                        retcode = SQLJR_RCF_TERMINATE | SQLJR_RCF_SQLCA;
                        error_found = 1;
                        goto rcv_end;
                    }
                }
                                        /* Set up the SQLJRA pointer.       */
                                        /* Mark location in new buffer.     */
                    dcsra = (SQLJDSRA *) ((char *) segments[0] + SQLC_SHORT_SIZE);
                    buf_ptr = segments[0] + (comm_buffer - ddsacb->buffer);
                }
            }

/* Get a pointer to start of array of */
                                        /*   actual input DA data lengths.    */
                                        /* Move comm buffer ptr to JRA params.*/
                                        /* Get a pointer to the JRA params.   */
            in_da_lens = (unsigned long *)&buf_ptr[0];
            buf_ptr += (num_in_sqlvars * SQLC_LONG_SIZE);
            jra_params = (char *)&buf_ptr[0];

/* Point to first triplet. ASSUME   */
                                        /*  THAT INDICATOR ARRAY IS FIRST!!!
            */
                                        /* For each triplet...              */
                                        /*  Set the pointer field to point  */
                                        /*  to the proper parameter field.  */
                                        /*  Move the pointer in the parameters*/
                                        /*   field based on field length.   */
                                        /*  Move to the next triplet.       */
            triplet_ptr = &(dcsra->sqlrflag);
            length_ptr  = &(dcsra->sqlrflgl);
            for (t_count = 0; t_count < SQLC_NUM_TRIPLETS; t_count++)
            {
                if (((unsigned long) *length_ptr) > 0)
                {
                    *triplet_ptr = jra_params;
                    jra_params += (unsigned long) *length_ptr;
                }
                else
                {
                    *triplet_ptr = NULL;
                }
                triplet_ptr = (char **) ((char *) triplet_ptr + SQLC_TRIPLET_SIZE);
                length_ptr  = (unsigned long *) ((char *) length_ptr + SQLC_TRIPLET_SIZE);
            }
                                        /* Set a pointer to start of DA area. */
                                        /* Initialize the output DA ptr.      */
                                        /* If there's an input DA, set the ptr*/
```

```
                                            /* If there's an output DA...      */
                                            /* Set the pointer.                */
                                            /* If this is all in the comm buffer.*/
                                            /*   Get private storage.          */
                                            /*   If can't, error and leave.    */
                                            /*   Copy the DA to private storage. */
                                            /*     NOTE: Output DA must be copied */
                                            /*           out of the buffer,    */
                                            /*           because it can be wiped */
                                            /*           out when we store return */
                                            /*           data (and we need it then*/
        buf_ptr = (char *) dcsra + ctl_struct_len;
        out_da_ptr = NULL;
        if (input_da_len > 0)
        {
            in_da_ptr = (struct sqlda *) ((parse_da_data) ? segments[1] : buf_ptr);
        }
        if (output_da_len > 0)
        {
            out_da_ptr = (struct sqlda *) ((parse_da_data) ?
                                  segments[2] : (buf_ptr + input_da_len));
            allocate_out_da = FALSE;
            if (num_segs_needed == 0)
            {
                retcode = sqlogblk(ddsacb->rsheap, (unsigned) output_da_len,
                              &private_out_da);
                if (retcode != 0)
                {
                    sqlcpsca((struct sqlca *)dcsra->sqlrcap, "SQLCPSVR",
                             (long) SQL_RC_E962);
                    sqlt_trace_error(SQLT_SQLC, SQLT_SQLCPSVR, 102, sizeof(short),
                             &retcode);
                    retcode = SQLJR_RCF_SQLCA;
                    error_found = 1;
                    goto rcv_end;
                }
                allocate_out_da = 1;
                sqlzmcpy(private_out_da, out_da_ptr, (unsigned int) output_da_len);
                out_da_ptr = private_out_da;
            }
        }
                                            /* Set the pointers to the input and */
                                            /* output SQLDAs.                  */
        dcsra->sqlrdapi = (char *) in_da_ptr;
        dcsra->sqlrdapo = (char *) out_da_ptr;
                                            /* If this is a runstat operation... */
                                            /* Get a pointer to the start of the */
                                            /* array of pointers in the proper */
                                            /*   triplet.                      */
                                            /* Loop through the number of indexes.*/
                                            /* For each, put the address of the */
                                            /*   string containing the index name */
                                            /*   (which is in a SQLVAR), in the */
                                            /*   data triplet.                 */
                                            /* Move forward in triplet to next ind*/
        if (runstat)
        {
```

```
                        t_run_ptr = dcsra->sqlrdata[1].sqlrdtp;
                        for (t_count = 0; t_count <
                            (short) (dcsra->sqlrdata[1].sqlrdtl / SQLC_LONG_SIZE);
                            t_count++)
                        {
                            t_addr_ptr = (char *) in_da_ptr->sqlvar[t_count].sqlname.data;
                            sqlzmcpy(t_run_ptr, &t_addr_ptr, SQLC_LONG_SIZE);
                            t_run_ptr += SQLC_LONG_SIZE;
                        }
                                                        /* Fix the number of indexes in the  */
                                                        /* triplet.                          */
                                                        /* Clear out the input da in the JRA. */
                                                        /* (we only need it for index names).*/
                        dcsra->sqlrdata[1].sqlrdtl /= SQLC_LONG_SIZE;
                        dcsra->sqlrdapi = NULL;
                        dcsra->sqlrdail = 0;
                    }
                                                        /* Clear out the input data pointer. */
                                                        /* If there's an input DA, and this  */
                                                        /* is not a "compile SQL" stmt...    */
                                                        /* and not a "runstat" stmt...       */
                                                        /* If we need input data in a segment.*/
                    input_data = NULL;
                    if ((in_da_ptr != NULL) && (!compile) && (!runstat))
                    {
                        if  (!parse_da_data)
                        {
                                                        /* Now we must deal with input data. */
                                                        /* If there is input data...         */
                                                        /* Loop through all sqlvars. For     */
                                                        /*   each SQLVAR...                  */
                                                        /*   1) Get a pointer to the SQLVAR. */
                                                        /*   2) If column data is NULL...    */
                                                        /*       Set up NULL pointer.        */
                                                        /*       Move forward in buffer.     */
                                                        /*   3) Else,                        */
                                                        /*       Set up the data pointer.    */
                                                        /*       Move in the data the size   */
                                                        /*       of this data item (to the   */
                                                        /*       next item.                  */
                                                        /*   4) Move to the next length in   */
                                                        /*       the array of lengths.       */
                            input_data = (char *) (buf_ptr + input_da_len + rcv_out_da_len);
                            for (t_count = 0; t_count < (unsigned int) num_in_sqlvars; t_count++)
                            {
                                t_sqlvar = (struct sqlvar *) &(in_da_ptr->sqlvar[t_count]);
                                if   ((t_sqlvar->sqltype & SQL_TYP_NULINC) != 0)
                                {
                                    t_sqlvar->sqlind = (short *) input_data;
                                    input_data += SQLC_SHORT_SIZE;
                                }
                                if   (((t_sqlvar->sqltype & SQL_TYP_NULINC) == 0) ||
                                      ((short) *t_sqlvar->sqlind >= 0))
                                {
                                    t_sqlvar->sqldata = (unsigned char *) input_data;
                                    input_data += (unsigned long) *in_da_lens;
                                }
```

```
                    in_da_lens = (unsigned long *) ((char *) in_da_lens +
            SQLC_LONG_SIZE);
                    }
            }
            else
            {
                                    /* Else we need 1 or more data segs.  */
                                    /* Save pointer to input lengths.     */
                                    /* Save first var number of this seg. */
                                    /* No vars saved yet.                 */
                                    /* For all of the sqlvars...          */
                                    /* Not yet done with input.           */
                    t_in_da_lens = in_da_lens;
                    start_var = 0;
                    total_var_space = 0;
                    done_with_input = FALSE;
                    for (t_count = 0; t_count < (unsigned int) num_in_sqlvars; t_count++)
                    {
                                    /* Get the SQLVAR.                    */
                                    /* Get the space needed for this var. */
                        t_sqlvar = (struct sqlvar *) &(in_da_ptr->sqlvar[t_count]);
                        this_var_space = 0;
                        if  ((t_sqlvar->sqltype & SQL_TYP_NULINC) != 0)
                        {
                            this_var_space = SQLC_SHORT_SIZE;
                        }
                        this_var_space += (unsigned short)
                                    ((unsigned long) *in_da_lens);

/* If this var won't fit in the seg.  */
                                    /* Allocate seg for previous vars.    */
                                    /* Get the data in the segment.       */
                        if  ((unsigned long) total_var_space + this_var_space >
                                SQLO_MAXSEGSIZ)
                        {
            alloc_space:
                            retcode = sqloallocseg(total_var_space, (char **)
                                            &segments[num_segs_needed],
                                            SQLO_MM_SHARE_GIVE);
                            if (retcode != 0)
                            {
                                sqlcpsca((struct sqlca *)dcsra->sqlrcap, "SQLCPSVR",
                                            (long) SQL_RC_E954);
                                sqlt_trace_error(SQLT_SQLC, SQLT_SQLCPSVR, 106,
                                            sizeof(short), &retcode);
                                retcode = SQLJR_RCF_SQLCA;
                                error_found = 1;
                                goto rcv_end;
                            }
                            retcode = sqlcpgd(ddsacb, &cb_buf_ptr, ddsacb->buffer,
                                            segments[num_segs_needed], total_var_space,
                                            FALSE);
                            if (retcode != 0)
                            {
                                sqlcperc(&ddsacb->comhandle,
                                        (struct sqlca *)dcsra->sqlrcap,
                                        "SQLCPSVR");
            /*                  sqlcpsca((struct sqlca *)dcsra->sqlrcap, "SQLCPSVR",
                                            (long) SQL_RC_E30080);              */
```

```
                    sqlt_trace_error(SQLT_SQLC, SQLT_SQLCPSVR, 112,
                              sizeof(short), &retcode);
            retcode = SQLJR_RCF_TERMINATE | SQLJR_RCF_SQLCA;
            error_found = 1;
            goto rcv_end;
        }
                              /* Now we have to go back and update  */
                              /*  the pointers for the segment.     */
                              /* Loop through the vars in this seg. */
                              /*  Get the SQLVAR.                   */
                              /*  Update either Null ind or data.   */
                              /*  Move forward the length pointer.  */
        input_data = segments[num_segs_needed];
        for (t_count2 = start_var; t_count2 < t_count; t_count2++)
        {
            t_sqlvar = (struct sqlvar *)
                    &(in_da_ptr->sqlvar[t_count2]);
            if  ((t_sqlvar->sqltype & SQL_TYP_NULINC) != 0)
            {
                t_sqlvar->sqlind = (short *) input_data;
                input_data += SQLC_SHORT_SIZE;
            }
            if  (((t_sqlvar->sqltype & SQL_TYP_NULINC) == 0) ||
                 ((short) *t_sqlvar->sqlind >= 0))
            {
                t_sqlvar->sqldata = (unsigned char *) input_data;
                input_data += (unsigned long) *t_in_da_lens;
            }
            t_in_da_lens = (unsigned long *)
                    ((char *) t_in_da_lens + SQLC_LONG_SIZE);
        }

/* Set up for next segment...          */
                              /* Save start of lengths.              */
                              /* Current var size is current total.  */
                              /* Current var is first var of segment*/
                              /* Move forward to next segment.       */
        t_in_da_lens = in_da_lens;
        total_var_space = this_var_space;
        start_var = t_count;
        num_segs_needed++;

/* If we were just putting the last    */
                              /*  vars in the buffer, skip on.       */
        if (done_with_input)
        {
            goto exit_input;
        }
    }
    else
    {
                              /* Just add this var to total if it    */
                              /*  fits.                              */
        total_var_space += this_var_space;
    }
                              /* Get next var's length.              */
    in_da_lens = (unsigned long *) ((char *) in_da_lens +
                    SQLC_LONG_SIZE);
```

```
                                }
                                                        /* We are done with loop, but the last*/
                                                        /* SQLVAR(s) need to be put in a seg.*/
                                                        /* Set a flag, and go back to take    */
                                                        /*    care of them.                   */
                                done_with_input = TRUE;
                                goto alloc_space;
                        exit_input: ;
                        }
                }

/* If there's output data and this is */
                                                        /* not a prepare or describe...       */
                if ((out_da_ptr != NULL) && (!prep_desc))
                {
                                                        /* If all output data fits in the     */
                                                        /* one allocated segment...           */
                        if  (!parse_da_data)
                        {
                                                        /* Output data all resides in one     */
                                                        /* area (need not be segmented).      */
                                                        /* For each output SQLVAR...          */
                                                        /* 1) Get a pointer to the SQLVAR.    */
                                                        /* 2) If this field is nullable.      */
                                                        /*      and there was a null pointer  */
                                                        /*      on the requester...           */
                                                        /*      Set the pointer for the null  */
                                                        /*      indicator.                    */
                                                        /*      Move forward in the output    */
                                                        /*      data.                         */
                                                        /* 3) Set the pointer for the data.   */
                                                        /* 4) Move forward in the output data*/
                                if (input_data == NULL)
                                {
                                        output_data = (char *) (buf_ptr + input_da_len + rcv_out_da_len);
                                }
                                else
                                {
                                        output_data = (char *) (input_data);
                                }
                                for (t_count = 0; t_count < out_da_ptr->sqld; t_count++)
                                {
                                        t_sqlvar = (struct sqlvar *) &(out_da_ptr->sqlvar[t_count]);
                                        if  (((t_sqlvar->sqltype & SQL_TYP_NULINC) != 0) &&
                                             (t_sqlvar->sqlind == 0))
                                        {
                                                t_sqlvar->sqlind = (short *) output_data;
                                                output_data += SQLC_SHORT_SIZE;
                                        }
                                        else
                                        {
                                                t_sqlvar->sqlind = NULL;
                                        }
                                        t_sqlvar->sqldata = (unsigned char *) output_data;
                                        output_data += sqlcpdlr(t_sqlvar);
                                }
                        }
                        else
```

```
                        {
                                                /* Else we need one or more output    */
                                                /*   data segments.                    */
                                                /* Save first var number of this seg. */
                                                /* No vars saved yet.                  */
                                                /* For all of the sqlvars...           */
                                                /* Not yet done with input.            */
                            start_var = 0;
                            total_var_space = 0;
                            done_with_input = FALSE;
                            for (t_count = 0; t_count < out_da_ptr->sqld; t_count++)
                            {
                                                /* Get the SQLVAR.                     */
                                                /* Get the space needed for this var. */
                                t_sqlvar = (struct sqlvar *) &(out_da_ptr->sqlvar[t_count]);
                                if  ((((t_sqlvar->sqltype & SQL_TYP_NULINC) != 0) &&
                                     (t_sqlvar->sqlind == 0))
                                {
                                    this_var_space = SQLC_SHORT_SIZE;
                                }
                                else
                                {
                                    this_var_space = 0;
                                }
                                this_var_space += sqlcpdlr(t_sqlvar);

/* If this var won't fit in the seg.  */
                                                /* Allocate seg for previous vars.    */
                                                /* Get the data in the segment.       */
                                if  ((unsigned long) total_var_space + this_var_space >
                                     SQLO_MAXSEGSIZ)
                                {
alloc_space_out:
                                    retcode = sqloallocseg(total_var_space, (char **)
                                                    &segments[num_segs_needed],
                                                    SQLO_MM_SHARE_GIVE);
                                    if (retcode != 0)
                                    {
                                        sqlcpsca((struct sqlca *)dcsra->sqlrcap, "SQLCPSVR",
                                                    (long) SQL_RC_E954);
                                        sqlt_trace_error(SQLT_SQLC, SQLT_SQLCPSVR, 107,
                                                    sizeof(short), &retcode);
                                        retcode = SQLJR_RCF_SQLCA;
                                        error_found = 1;
                                        goto rcv_end;
                                    }

/* Now we have to go back and update  */
                                                /*   the pointers for the segment.    */
                                                /* Loop through the vars in this seg. */
                                                /*   Get the SQLVAR.                   */
                                                /*   Update either Null ind or data.   */
                                                /*   Move forward the length pointer.  */
                                    output_data = segments[num_segs_needed];
                                    for (t_count2 = start_var; t_count2 < t_count; t_count2++)
                                    {
                                        t_sqlvar = (struct sqlvar *)
                                                    &(out_da_ptr->sqlvar[t_count2]);
                                        if  ((t_sqlvar->sqltype & SQL_TYP_NULINC != 0) &&
```

```
                (t_sqlvar->sqlind == 0))
            {
                t_sqlvar->sqlind = (short *) output_data;
                output_data += SQLC_SHORT_SIZE;
            }
            else
            {
                t_sqlvar->sqlind = NULL;
            }
            t_sqlvar->sqldata = (unsigned char *) output_data;
            output_data += sqlcpdlr(t_sqlvar);
        }

/* Set up for next segment...          */
                            /* Current var size is current total.  */
                            /* Current var is first var of segment*/
                            /* Move forward to next segment.       */
        total_var_space = this_var_space;
        start_var = t_count;
        num_segs_needed++;

/* If we were just putting the last    */
                            /* vars in the buffer, skip on.        */
        if (done_with_input)
        {
            goto exit_output;
        }
    }
    else
    {
                            /* Just add this var to total if it    */
                            /*  fits.                              */
        total_var_space += this_var_space;
    }
}

/* We are done with loop, but the last*/
                            /*  SQLVAR(s) need to be put in a seg.*/
                            /* Set a flag, and go back to take    */
                            /*   care of them.                    */
done_with_input = TRUE;
goto alloc_space_out;
exit_output: ;
        }
    }

/* If this is a fetch request...       */
                            /* Get the CCB.                        */
                            /* If found (blocking)...              */
                            /*   Set on the blocking flag.         */
                            /*   Set up the buffer for return.     */
                            /*   Set up the data in the return     */
                            /*    buffer.                          */
    if (fetch)
    {
        sqlcpcsr(temp_ccb, svr_ccbs, *((unsigned short *) dcsra->sqlrsect),
                 dcsra->sqlrcrea,
                 (unsigned short) dcsra->sqlrcrel, dcsra->sqlrpgmn,
                 (unsigned short) dcsra->sqlrpgml);
```

```
        if (temp_ccb != NULL)
        {
           blocking = 1;
           comm_buffer = ddsacb->buffer + SQLC_SHORT_SIZE;
           sqlcpfet(ddsacb, &comm_buffer, temp_ccb);
        }
     } rcv_end:
                                      /*Trace the content of the input DA*/
     if (in_da_ptr != NULL)
     {
        sqlt_trace_misc1(SQLT_SQLC,SQLT_SQLCPSVR,190,(short )input_da_len,
                ,(void *) in_da_ptr);
     }
     return(retcode);
  }

/******************************-PROLOGUE-******************************
  **
  *                                                                     *
  * OCO SOURCE MATERIALS
  *
  * IBM CONFIDENTIAL (IBM CONFIDENTIAL-RESTRICTED WHEN
  COMBINED WITH THE      *
  * AGGREGATED OCO SOURCE MODULES FOR THIS PROGRAM)
             *
  *                                                                     *
  * MODULE NAME:    sqlcpreq                                            *
  *                                                                *
  * COMPONENT NAME:   Distributed Data Services
  *
  *                                                                *
  *             JRA data stream requestor                               *
  *                                                                *
  * LPP NAME:       Gemstone                                            *
  *                                                                *
  * DESCRIPTIVE NAME: Construct JRA requestor data stream
    *
  *                                                                *
  * COPYRIGHT:      program-number (C) COPYRIGHT IBM CORP 1991
             *
  *                                                                     *
  * STATUS:         Development Phase                                   *
  *                                                                *
  * FUNCTION:                                                           *
  *     This module contains a set of functions to construct the JRA data  *
  *     stream and send it to the server.                               *
  ***********************************************************************/
  #define LINT_ARGS 1 include "sqlz.h"
  #include "sqlo.h"
  #include "sqlocall.h"
  #include "sqlenv.h"
  #include "sqljacb.h"
  #include "sqljra.h"
  #include "sqljrai.h"
  #include "sqler.h"
  #include "sqlra.h"
```

```
#include "sqlca.h"
#include "sqlcc.h"
#include "sqlcm.h"
#include "sqlcmi.h"
#include "sqle.h"
#include "sqlei.h"
#include "sqltc.h"
#include "sqlchdda.h"
#include "sqlc.h"
#include "sqlci.h"
#include "sqlcodes.h"
#include "sqlrx.h"
#include "sqlda.h"
#include "sql.h"
#include "sqlcitoh.h"
#include "sqlcpccb.h"
#include "sqltc.h"
#include "sqlcpcom.h"
#include "sqlcpreq.h"

/***************************************************************************/
/* SQLCPSND:                                                               */
/*    Function: Construct JRA data stream and send it to the server.       */
/*    Input:                                                               */
/*        Pointer to ddsacb                                                */
/*        Pointer to dcsra                                                 */
/*    Output:                                                              */
/*        The output SQLDA pointed by the dcsra                            */
/***************************************************************************/ int  SQLZ_LOCAL sqlcpsnd (struct sqlcacb *ddsacb,
                          SQLJDSRA *dcsra)

{
    unsigned int loc;              /* Com buffer location pointer    */
    int i;                         /* Loop counter                   */
    short buffer_len;              /* Length of the com buffer       */
    SQLJDATA *triplet;             /* Current triplet pointer        */
    char *combuf;                  /* Comm buffer pointer            */
    struct sqlcplen *dslenptr;     /* Pointer to the data stream length */
                                   /* structure in the com buffer    */

/* Actual length of input sqlvars */
                                   /* Static allocated               */
    unsigned long  sqlvar_actlen_in[STATIC_VARS];
    unsigned long  *act_len_in;    /* Actual length of input sqlvars */
                                   /* Flag to indicate whether the actual*/
                                   /* length array has been allocated for*/
                                   /* input DA                       */
    unsigned short alloc_flag_in = 0;
    unsigned long jra_parm_len = 0;   /* JRA parameter length        */
    unsigned int da_size;             /* size of the DA              */
    unsigned int out_da_size = 0;     /* size of the output DA
*/
    struct sqlda *in_da;              /* Input DA pointer            */
    struct sqlda *out_da = NULL;      /* Outpout DA pointer          */
    struct sqlca *ca_ptr;             /* SQLCA pointer               */
    struct sqlvar *sqlvar;
```

```
        struct sqlda *run_da= NULL;      /* SQLDA allocated to store run stat */
                                         /* index list                        */
        struct sqlda *useroutda;         /* User output da                    */
        char *index_ptr;                 /* index name for runstat            */
        unsigned int run_da_size;        /* DA size allocated for runstat     */
        short no_index;                  /* Number of runstat indexes         */
                                         /* The following variables are for   */
                                         /* cursor operations                 */
        struct sqlcp_ccb *temp_ccb;
        SQLJDSRA *comra;                 /* JRA in the com buffer             */
        int retcode = 0;
        int err_retcode = 0;             /* Positive error return code        */
        short zero = 0;

/******************************************************************************
        The communication buffer(s) contain the following in order
        ---------------------------------------------------
        |ll |sqljra |control strucutre length | input data length
        ---- ------- ---------- ----------- -----------------
              | output data length | Array of input sqlvar actual length
              ----------------------------------------------
              |JRA parm length JRA parm | Input SQLDA | Output SQLDA |
              ----------------------------------------------
              |Input data length
              ----------------------------------------------

******************************************************************************
/
        in_da = (struct sqlda *)dcsra->sqlrdapi;

/* Allocate space for the temporary  */
                                         /* output da and copy userda into it */
        useroutda =(struct sqlda *)dcsra->sqlrdapo;
                                         /* pick up the com buffer address    */
        combuf = ddsacb->buffer;
        comra = (SQLJDSRA *) (combuf + loc);   /*Points the the RA in the com
buffer */
                                         /* copy the dcsra into the com buffer */
        sqlzmcpy((char *) (combuf + loc) ,dcsra, JRASIZE);
                                         /* If it is a blocked fetch, set the  */
                                         /* outpout da length in the com buffer*/
                                         /* to be 0.                           */
        if (req_blocking)
        {
            comra->sqlrdaol = 0L;
        }
                                         /* point to next position in the buf  */
        loc += JRASIZE;
                                         /* points the data stream length      */
                                         /* structure                          */
        dslenptr = (struct sqlcplen *)(combuf + loc);
                                         /* initlialize the control structure  */
                                         /* length                             */
        if ((in_da != 0) && (! req_compile) && (! req_runstat))
        {
            dslenptr->cs_len = JRASIZE + SQLCPLEN_SIZE(in_da->sqld);
        }
        else dslenptr->cs_len = JRASIZE + SQLCPLEN_SIZE(0);
```

```
            dslenptr->in_data_len = 0;
            dslenptr->out_data_len = 0;
                                                /* Ignore the input data field for   */
                                                /* compile request type              */
            if (in_da != 0 && (!req_compile)&& (!req_runstat) )
            {
                dslenptr->num_of_vars = in_da->sqld;
            }
            else
            {
                dslenptr->num_of_vars = 0;
            }

/* Set the number of output SQLVARs. */
            if (out_da != NULL)
            {
                dslenptr->num_of_out_vars = out_da->sqld;
            }
            else
            {
                dslenptr->num_of_out_vars = 0;
            } loc +=SQLCPLEN_SIZE(0);             /* points to the input sqlvar length */
                                                /* array                             */ triplet = (SQLJDATA *) &(dcsra->sqlrflgl);
                                                /* Get total jra parm length         */
                                                /* Since JRA parameters might not be */
                                                /* all in the first com buffer,we must*/
                                                /* get the parameter length before the*/
                                                /* first com buffer got sent         */
            for (i=0;i < MAX_JRA_TRIPLET ;i++ )
            {
                                                /* Update total JRA parameter length */
                jra_parm_len += triplet->sqlrdtl;
                triplet++;                      /* Point to the next triplet         */
            }                                   /* endfor                            */ dslenptr->cs_len += jra_parm_len;   /* Add total jra parameter length to */
                                                /* control sructure length           */

/* scan input DA to get the actual   */
                                                /* data length of each sqlvar and the */
                                                /* total input data length           */
                                                /* If the JRA request type is compile */
                                                /* Skip the input data               */
                                                /* If data type is nullable, add two */
                                                /* bytes to the actual data length   */
            if ((in_da != NULL) && (!req_compile) && (!req_runstat))
            {
                for (i=0;i < in_da->sqld ;i++ )
                {
                    sqlvar = &(in_da->sqlvar[i]);

if (SQLV_IND_EXISTS(sqlvar) && (*(sqlvar->sqlind) < 0))
                    {
                        act_len_in[i]=0;
                    }
```

```
            else
            {
               act_len_in[i] = (unsigned long) sqlcpdls(sqlvar);
            }
            if ( (sqlvar->sqltype & SQL_TYP_NULINC) != 0)
            {
               dslenptr->in_data_len += SQLC_SHORT_SIZE;
            }
            dslenptr->in_data_len += act_len_in[i];
         }                                      /* endfor                     */
      }                                         /* end in_da check            */
                                                /* scan output DA to get the total */
                                                /* output data length         */
                                                /* Skip this code if it is fetch and */
                                                /* and blocking               */
      if (out_da != NULL && !req_blocking)
      {
         for (i=0;i < out_da->sqld ;i++ )
         {
            sqlvar = &(out_da->sqlvar[i]);
            dslenptr->out_data_len += (unsigned long) sqlcpdlr(sqlvar);
                                                /* If the data type is nullable and */
                                                /* the null indicator is not null, ask*/
                                                /* the server to allocate space for */
                                                /* the null indicator         */
            if (((sqlvar->sqltype & SQL_TYP_NULINC) != 0) &&
                (sqlvar->sqlind != NULL))
            {
               dslenptr->out_data_len += SQLC_SHORT_SIZE;
            }
                                                /*If the null indicator exists, set */
                                                /*the null indicator value to -1.   */
                                                /*Otherwise, set the null indicator */
                                                /*to 0                        */
            if (sqlvar->sqlind == NULL)
            {
               sqlvar->sqlind = (short *) -1;
            }
            else
            {
               sqlvar->sqlind = (short *) 0;
            }
         } /* endfor */
      }
                                                /* all length information pointed by */
                                                /* dslenptr is set. Move length array */
                                                /* into data stream           */
                                                /* If there is any communcation error */
                                                /* occurs, exits              */
      if (in_da != NULL && (!req_compile) &&(! req_runstat) )
      {
         err_retcode = sqlcpmd( ddsacb, &loc, (char *) act_len_in,
                           sizeof(long)*(in_da->sqld), ca_ptr);

if (err_retcode == SQLJR_RCF_TERMINATE)
         {
            goto exit;
         }
```

```
                    }
/**************************************************************************/
/*                      Create JRA parameters data stream        */
/**************************************************************************/
                                /* points to the first JRA triplet  */
    triplet = (SQLJDATA *) &(dcsra->sqlrflgl);
                                /* Loop through all the triplets    */
    for (i=0;i < MAX_JRA_TRIPLET ;i++ )
    {
                                /* Move JRA parmeters into data stream*/
        if (triplet->sqlrdtl > 0)
        {
            err_retcode =sqlcpmd( ddsacb,&loc,triplet->sqlrdtp,
                        (unsigned int) triplet->sqlrdtl,ca_ptr);
            if (err_retcode == SQLJR_RCF_TERMINATE)
            {
                goto exit;
            }
        }
        triplet++;
    }                           /* endfor                           */
/**************************************************************************/
/*                      SQLJRA and parameters have been put     */
/*                      into the communication buffer.          */
/**************************************************************************/
/**************************************************************************/
/*                      Move the input DA into data stream      */
/**************************************************************************/
    if (dcsra->sqlrdapi != NULL)
    {
                                /* Caculate the size of the DA      */
        da_size = SQLDASIZE(((struct sqlda *)dcsra->sqlrdapi)->sqld);
                                /* Move DA into the com buffer      */
        err_retcode = sqlcpmd(ddsacb, &loc,(char *) (dcsra->sqlrdapi),
                        da_size, ca_ptr);
        if (err_retcode == SQLJR_RCF_TERMINATE)
        {
            goto exit;
        }
    }                           /* End sqlrdapi check               */

/**************************************************************************/
/*                      Move the output DA into data stream     */
/**************************************************************************/
    if ((out_da != NULL) && (!req_blocking))
    {
                                /* Move DA into the com buffer      */
        err_retcode = sqlcpmd(ddsacb,&loc,(char *) out_da, out_da_size,ca_ptr);
        if (err_retcode == SQLJR_RCF_TERMINATE)
        {
            goto exit;
        }
    }                           /* End sqlrdapo check               */
/**************************************************************************/
/*                      Put input data into datastream.         */
/**************************************************************************/
```

```
                                    /* If input data exists              */
                                    /* and the JRA request type is not   */
                                    /* compile or runstat                */
        if ( (in_da != NULL) && (!req_compile) && (!req_runstat))
        {
            i = 0;
                                    /* Loop through all the sqlvars      */
            while ((ca_ptr->sqlcode == SQL_RC_OK) && ( i < in_da->sqld) )
            {
                                    /* Get the next SQLVAR.              */
                sqlvar = &(in_da->sqlvar[i]);

/* If the data type is nullable, send */
                                    /* null indicator contents into the   */
                                    /* datastream                         */
                if ( (sqlvar->sqltype & SQL_TYP_NULINC) != 0)
                {
                    if ((sqlvar->sqlind != NULL ) && ((short) *(sqlvar->sqlind) != 0))
                    {
                        err_retcode = sqlcpmd(ddsacb, &loc,
                                        (char *)(in_da->sqlvar[i].sqlind),
                                        SQLC_SHORT_SIZE,ca_ptr);
                    }
                    else
                    {
                        err_retcode = sqlcpmd(ddsacb, &loc,(char *)&zero,
                                        SQLC_SHORT_SIZE,ca_ptr);
                    }
                    if (err_retcode == SQLJR_RCF_TERMINATE)
                    {
                        goto exit;
                    }
                }
                                    /* Move the data into data stream    */
                if (act_len_in[i] > 0)
                {
                    err_retcode = sqlcpmd(ddsacb, &loc,sqlvar->sqldata,
                                    (unsigned int) act_len_in[i],ca_ptr);
                    if (err_retcode == SQLJR_RCF_TERMINATE)
                    {
                        goto exit;
                    }
                }
                i++;
            }                       /* endwhile                          */
        }                           /* end compile request type check    */
                                    /* Process the remaining data in the */
                                    /* com buffer                        */
        if ((ca_ptr->sqlcode == SQL_RC_OK) && (loc > SQLC_SHORT_SIZE))
        {
                                    /* Store the length into the buffer  */
                                    /* byte reversed                     */
            buffer_len = SQLC_SWAP2(loc);
            sqlzmcpy(ddsacb->buffer,&buffer_len,SQLC_SHORT_SIZE);

/* Send it                           */
            retcode = sqlccsen(&ddsacb->comhandle,(short) loc,ddsacb->buffer);
            if (retcode < 0)
```

```
            {
                sqlcperc(&ddsacb->comhandle,ca_ptr,"SQLCPREQ");
                err_retcode |= SQLJR_RCF_TERMINATE;
                goto exit;
            }
        }                               /* End of sqlcode and loc check    */

/****************************************************************************
*/
/*                          Cleaning things up                             */
/****************************************************************************
*/
exit:
                                        /* Free tempory da                 */
        if (out_da != NULL)
        {
            retcode = sqlofblk(ddsacb->rsheap,out_da_size ,out_da);
                                        /* Terminate if error on free      */
            if ( retcode != 0 )
            {
                sqlcpsca(ca_ptr,"SQLCPREQ", (long) SQL_RC_E902) ;
                err_retcode |= SQLJR_RCF_SQLCA;
            }
        }
                                        /* Free dynamically allocated actual */
                                        /* length array for input DA       */
        if (alloc_flag_in > 0)
        {
            retcode = sqlofblk(ddsacb->rsheap, sizeof(long) * in_da->sqld,act_len_in);
                                        /* Terminate if error on free      */
            if ( retcode != 0 )
            {
                sqlcpsca(ca_ptr,"SQLCPREQ", (long) SQL_RC_E902) ;
                err_retcode |= SQLJR_RCF_SQLCA;
            }
        }                               /*End if on free block check       */

/* Free the da space allocated for */
                                        /* run stat                        */
```

```
     if (run_da != NULL)
     {
       retcode = sqlofblk(ddsacb->rsheap, run_da_size, run_da);
       if ( retcode != 0 )
       {
           sqlcpsca(ca_ptr,"SQLCPREQ", (long) SQL_RC_E902) ;
           err_retcode |= SQLJR_RCF_SQLCA;
       }
     } return(err_retcode);
}
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. Apparatus for efficiently accessing information in a database, comprising:

means for creating on a first computer, a memory requirement data structure;

means for creating on said first computer, a database query designed to execute on a second computer;

means in first computer responsive to said means for creating a memory requirement data structure and said means for creating a database query for generating a first communications buffer on said first computer containing said memory requirement data structure and said database query designed to execute on said second computer;

means responsive to said means for generating a first communications buffer for transmitting said first communications buffer to said second computer;

means responsive to said means for transmitting, for receiving data stored in said first communications buffer on said second computer;

means in said second computer responsive to said means for receiving, for querying said memory requirement data structure in said first communications buffer;

means responsive to said means for querying, for determining an amount of memory in said second computer needed to store the results of said database query;

means responsive to said means for determining, for allocating a second communications buffer in contiguous memory space on said second computer, wherein said second communications buffer is large enough to store the results of said database query;

means responsive to said means for allocating, for executing said database query on said second computer;

means responsive to said means for executing said database query for storing results of said database query in said second communications buffer;

means responsive to said means for storing, for transmitting data stored in said second communications buffer to said first computer; and means in said first computer responsive to said means for transmitting in said second computer for receiving data stored in said second communications buffer.

2. Apparatus for efficiently accessing information in a database, according to claim 1, wherein the means for allocating a second communications buffer further comprises:

means for constructing said second communications buffer from one or more contiguous communications buffers if an amount of data to be accessed in response to execution of said database query on said second computer exceeds a maximum data capacity of a single communications buffer.

3. Apparatus for efficiently accessing information in a database, according to claim 1, further comprising:

means for dynamically adjusting a communications buffer address pointer to a next available memory area within said second communications buffer, for storage of said results of said database query.

4. A method for efficiently accessing information in a database, comprising the steps of:

creating on a first computer, a memory requirement data structure;

creating, on said first computer, a database query for execution on a second computer;

constructing a first communications buffer in said first computer containing said memory requirement data structure and said database query;

transmitting data stored in said first communications buffer to said second computer;

receiving said data stored in said first communications buffer in said second computer;

querying said memory requirement data structure for determining the amount of memory in said second computer needed to store the results of said database query;

allocating in response to said determining, a second communications buffer in contiguous memory space on said second computer, wherein said second communications buffer is large enough to store the results of said database query;

executing in response to said received data said database query in said second computer;

storing results of said database query in said second communications buffer in said second computer;

transmitting data stored in said second communications buffer to said first computer; and receiving data transmitted from said second communications buffer to said first computer in said first computer.

5. A method for efficiently accessing information in a database, according to claim 4, wherein the step of allocating a second communications buffer further comprises the step of:

constructing said second communications buffer from one or more contiguous communications buffers on said second computer, if an amount of data to be accessed in response to execution of said database query on said second computer exceeds a maximum data capacity of a single communications buffer.

6. A method for efficiently accessing information in a database, according to claim 4, further comprising the step of:

dynamically adjusting a communications buffer address pointer to a next available memory area within said second communications buffer, for storage of said results of said database query.

* * * * *

UNITED STATES PATENT AND TRADEMARK OFFICE
CERTIFICATE OF CORRECTION

PATENT NO. : 5,875,442
DATED : Feb. 23, 1999
INVENTOR(S) : Jordan, II et al

It is certified that error appears in the above-identified patent and that said Letters Patent is hereby corrected as shown below:

Column 3, line 66, please delete "SQLURA" and insert --SQLJRA--;
Column 4, line 61, please delete "IN_DATA_LEN" and insert --IN_DATA _LEN--;
Claim 1, column 63, line 15, after "means in" please insert --said--.

Signed and Sealed this

Third Day of August, 1999

Attest:

Q. TODD DICKINSON

*Attesting Officer*  *Acting Commissioner of Patents and Trademarks*